Jan. 13, 1959 G. TRÉPAUD 2,867,986
PROCESS TO DEMINERALIZE OR TO CONCENTRATE THE
SALINE SOLUTIONS BY FREEZING SAID SOLUTIONS
Filed May 12, 1955 3 Sheets-Sheet 3

_____

United States Patent Office 2,867,986
Patented Jan. 13, 1959

_____

2,867,986

PROCESS TO DEMINERALIZE OR TO CONCENTRATE THE SALINE SOLUTIONS BY FREEZING SAID SOLUTIONS

Georges Trépaud, Paris, France

Application May 12, 1955, Serial No. 507,967

Claims priority, application France May 12, 1954

10 Claims. (Cl. 62—58)

The present invention relates to a process for diluting or concentrating the saline solutions by freezing said solutions and aims particularly at producing fresh water from sea water. Several processes have already been proposed for producing fresh water from sea water by freezing the sea water once or several times. It has been found that, by partly freezing a saline solution such as sea water some ice is obtained having a salt amount being approximately three times smaller than the amount of the initial solution, the residual solution having an amount of salt very much higher than the amount of the initial solution.

It has been suggested to produce fresh water from sea water by successive freezings and meltings: for instance starting with sea water containing about 30 grams of dissolved salt per liter, a first freezing produces, after melting, a water containing about 10 grams of salt per liter: a second freezing produces, after melting, a water containing about 3.3 grams of salt per liter and a fourth, a water containing 1.1 grams of salt per liter.

Thus, it is possible to produce drinking water after four freezing operations. However, this process requires a large consumption of cold and is in consequence thereof expensive: in addition, the large number of freezing operations in succession reduces the output of the plant, if a large number of very powerful freezing machines are not available. Despite the possible recovery of the heat quantities given out by the melting of the fresh ice and of the heat quantities contained in the residual solutions after each melting, the process does not appear to be sufficiently economical. The same applies to a somewhat different process in which the ice produced by a single freezing operation of the sea water, is submitted, after removal of the residual salted solution, to a rinsing with fresh water which results in removing the salt retained in the ice crystals. Nevertheless, to obtain by this process, an ice sufficiently fresh to give a drinkable water, a comparatively very important amount of fresh rinsing water is required and also an extensive rinsing which brings about the melting of a large part of the ice: thus the efficiency of this process also is not very satisfactory.

One of the features of the present invention is the economical production of fresh water from sea water submitted to a single freezing operation. Another feature of the invention consists in partly freezing the saline solution, separating the residual solution of the ice thus produced, splitting the ice into pieces, progressively warming up anew the ice, by means of a flow of a suitably conditioned air, up to a temperature slightly below 0° C., the water produced by the melting and containing a large amount of salt being drained off until the amount of salt in the ice falls to the required value.

The inexpensiveness of the process results from the fact that, as the ice is kept during the warming up stage at a temperature below and very close to 0° C., the crystals of fresh water will melt very slowly and particularly at the surface of the pieces of ice coming from the freezing machine whilst the liquid, at a high concentration of salt has a freezing temperature much below the freezing temperature of the fresh water retained between the crystals of ice and succeeds in forcing its way between these crystals and passes to the outside.

For a better understanding of the phenomenon upon which the invention is based, the physical laws of the solutions are recalled hereafter with reference to the annexed drawing, showing, by way of example, some embodiments of the invention.

Figure 1:
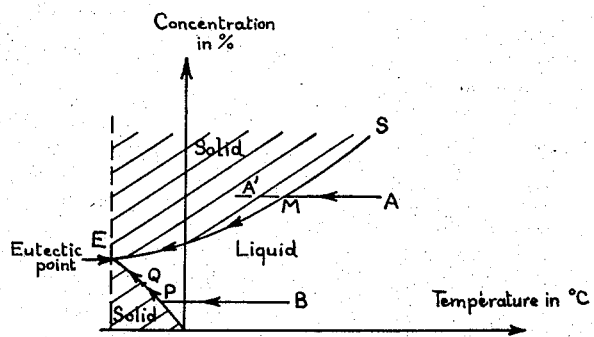
Fig. 1 is a diagram showing the concentration of a solution plotted against the temperature.

In the diagram of Fig. 1, in which the abscissas are the temperatures and the ordinates the concentrations of the solutions, the curve S is the saturation curve of a solution. The point A, outside the curve, corresponds to a non saturated solution. If this solution is cooled, starting from the state illustrated by A, the characteristic point A will move along the horizontal straight line A—M until it meets the curve S in M. (It may happen that the representative point curve crosses the saturation curve S to come to A', but in this case, it is enough to throw a small crystal of the dissolved salt into the solution to bring this state of false equilibrium to an end. In these conditions any further cooling of the solution, starting from the point M, brings the characteristic point A to move along the curve S and during this period a deposit of crystals of the dissolved salt is observed while the concentration of the solution decreases until the characteristic point reaches a point E, called the eutectic point at which the entire solution solidifies forming distinct crystals of salt and of ice.

In the same way, in starting from the point B, corresponding to a concentration being smaller than the eutectic concentration, the freezing begins only at the point P, at a temperature below 0° C. and the crystals thus formed consist of pure ice, so that the salt concentration of the solution increases progressively, the point P moving substantially along on the curve OE and, with a sufficient cooling, reaching the same eutectic point E.

Inversely, if the cooling is stopped in a point Q before reaching the eutectic point and if the whole solution and ice crystals are warmed up, the ice dissolves progressively and disappears in P.

In the physical laws described hereinabove are taken into account, it can be said that in plants where the freezing machines treat salted solutions having concentrations smaller than the eutectic concentration, the ice crystals formed consist of pure ice. Nevertheless, as the freezing progresses, the crystals of pure ice grow larger and coalesce, retaining drops of liquid, the salt concentration of which is more or less high, according to the initial concentration and to the temperature in the freezing machine at this coalescence of the ice crystals. As the freezing operation progresses, a part of the water of this solution will freeze and, as the salts contained in this water cannot escape, the concentration of the retained liquid increases, following the line OE, shown in Fig. 1. At the end of the freezing, the lumps of ice thus obtained are not homogeneous and enclose a number of small cavities filled up with a solution having a high salt concentration. For this reason the melting of the ice thus obtained without special care will give salted water and not fresh water.

Figure 2:
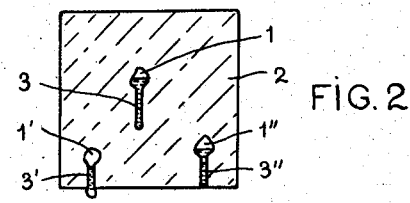
Fig. 2 shows a phenomenon occurring with a solution.

On the contrary, according to another feature of the process described by the present invention in which the ice formed from the sea water is slowly and progressively warmed up, for instance by means of a suitably conditioned current of air, the ice will not melt in the whole: nevertheless, the warming up destroys the equilibrium of the solution retained in the cavities and the representative point Q of Fig. 1 follows the line Q—P, dissolving a part of the ice at the surface of the cavity. As the volume of the water resulting from the melting of the ice is smaller than the volume of this ice before melting, the cavity is no larger filled with a liquid. In combination with the gravity, this phenomenon causes a downward propagation of the melting of the ice and by maintaining the warming up and its duration at a sufficient level, the channel produced by the melting of the ice reaches the outer wall of the lump of ice and the salted solution can thus be drained of. Fig. 2 illustrates this phenomenon during which the small cavities, such as $1$, $1'$, $1''$ . . . contained in the lump of ice 2 expand downwards and produce in expanding small channels, $3$, $3'$, $3''$ . . . which at their ends open at the surface.

Although the invention aims in particular at producing fresh water from sea water, it may also be used for producing from any solution ice containing a very small amount of salt, for producing from the water of a river or from brackish water, waters sufficiently purified for some industrial uses (for instance for the feed of boilers); the invention may be used alone or in connection with other physical treatments, such as a distillation or with chemical treatments such as the exchange of ions.

Still another feature of the invention is that it may be applied to the reverse problem and allows, by removing the pure ice formed during the first operation, to increase the concentration of the initial solutions, this removal being carried on, during the warming up of the ice, by the collection of the oozings of the salted solution retained in the ice.

Figure 3:
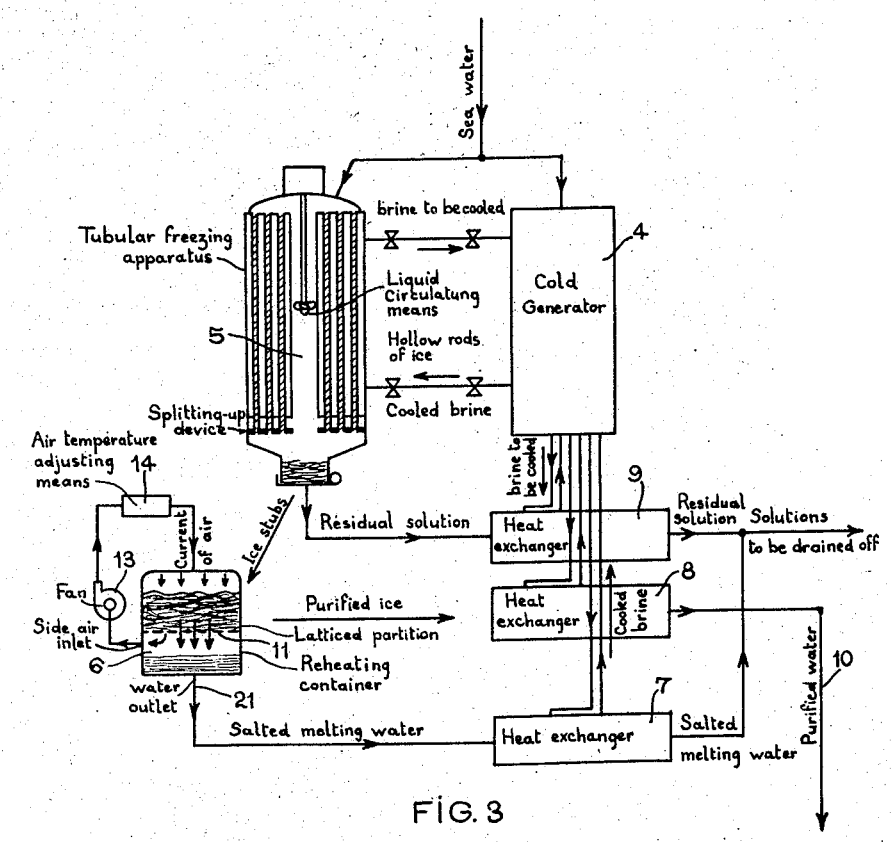
Fig. 3 is a diagrammatic illustration of a plant according to one embodiment of the invention.

As shown in Fig. 3, the plant includes a cold generator 4 feeding for instance with a cold brine, a refrigerator 5, preferably of the tubular kind as described in my Patent No. 2,663,162 in which the liquid to be frozen passes in forced circulation through the freezing pipes (not shown) during the phase of freezing, as this arrangement facilitates the removal of an important amount of the salt which has been separated from the water during the formation of the crystals of ice. The hollow cylindrical rods of ice formed in the refrigerator 5 are cut into stubs after the stripping and after withdrawal of the residual solution which is driven into a heat exchanger 8, said ice stubs are placed, in a reheating container 6 in which they are warmed up by a current of air, as will be described hereinafter. During this warming up, the concentrated solution oozing from the ice is collected and driven, into an heat exchanger 7 for recovering the heat contained in this solution, at the output of which it is drained off at the same time as the solution coming from the refrigerator 5 after passing through the heat exchanger 8. Once the warming up of the ice has been completed, the ice is removed from the container 6, into a heat exchanger 9, where it is melted and thereby supplies fresh water in the piping 10. The quantities, thus recuperated in the heat exchangers 7, 8, 9 may be used, for instance, for a previous cooling of the sea water to be frozen, to improve the condensation, or for any other use.

Figure 4:
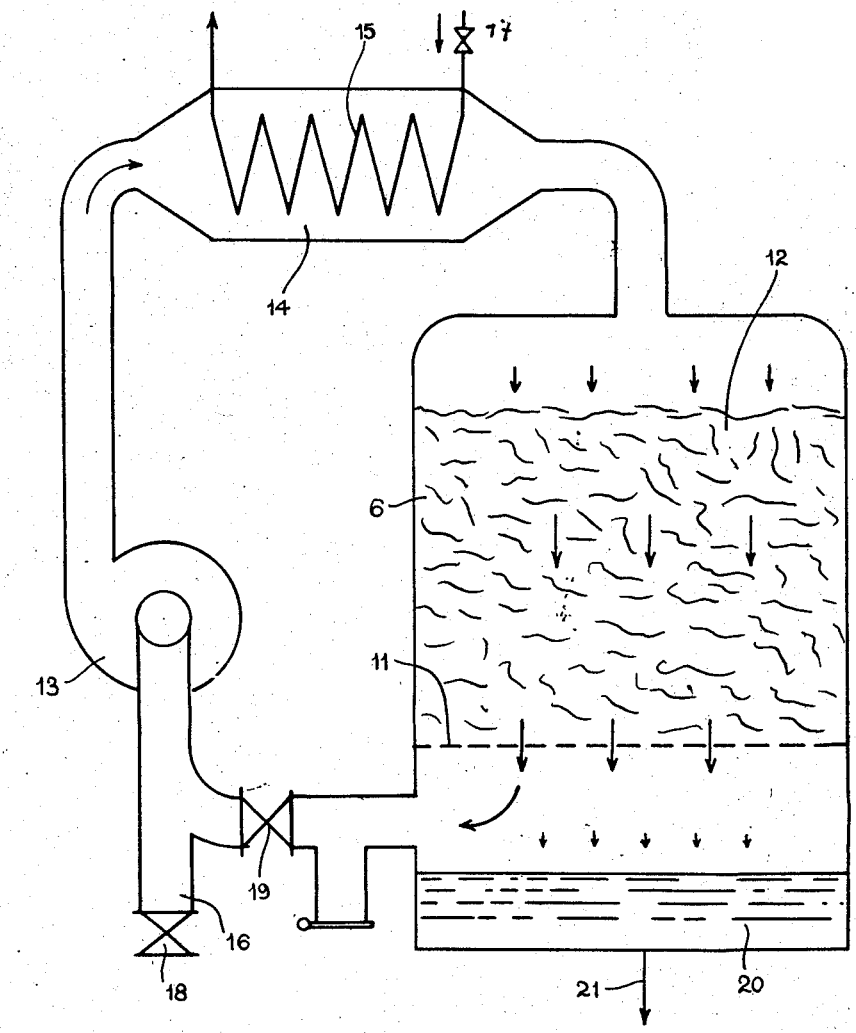
Fig. 4 is an elevational section of a part of Fig. 3.

As shown in Fig. 4 the reheating container 6 is formed by a cylindrical vat provided with an intermediate grid bottom 11 upon which the ice coming from the refrigerator rests; this ice is in the shape of rings to facilitate the passage of the ventilating air through the mass. The reheating air is moved through in the container 6 by means of a fan 13 having a large output; the temperature of this air is kept at a constant value by means of a double adjustment, including, on the one hand, a cooler 14 in which the air of the fan comes into contact with a coil 15 fed with a cold brine coming from the freezing plant and, on the other hand, a supply of air at the surrounding temperature, coming through the pipe 16. The cooling by the exchanger 14 and the reheating of the air by the air-inlet 16 are adjusted by means of valves 17, 18, automatically operated by thermostats. A valve 19 in the circuit of the reheating air allows to adjust the output of air. During the reheating, the solution containing a large amount of salt flows through the grid 11 and drop in 20 into the bottom of the vat 6, to be removed later on through a discharge pipe 21.

The practice has shown that, in freezing sea water having an amount of 32 grams of sodium chloride per liter in a refrigerator of the kind described hereinabove and supplied with a cold brine at a temperature ranging from $-5°$ to $-10°$ C., after removal of the residual solution, ice is obtained having an amount of 10 grams of salt whereas the concentration of the residual solution is 42.35 grams per liter.

After a reheating lasting from 45 minutes to one hour, with an output of air adjusted to keep the whole of the load of ice slightly below 0° C., it is obtained, after melting of the ice, a water having an amount of 1.17 grams to 0.44 gram of salt per liter, according to the duration and the output of the ventilation. The quantity of fresh water thus obtained is approximately of 60% to 90% of the weight of the ice produced.

On the whole, with ice containing from 7 to 12 gr. of salt per liter and a melting from 10 to 40%, water is obtained having a salinity ranging from less than 0.5 gram to 3 grams per liter, according to the freezing and reheating conditions. With brackish water, the residual amounts of salt in the obtained water are reduced accordingly.

Figure 5:
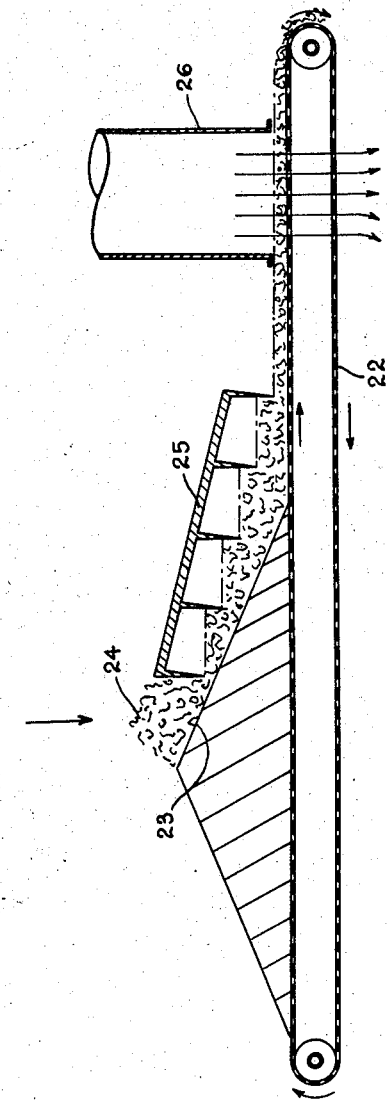
Fig. 5 is a side elevation of a plant according to another embodiment of the invention.

In Fig. 5, another embodiment of a device for carrying out the process according to the invention is shown.

According to this embodiment, the ice, consisting of relatively small pieces, for instance cuttings of tubular rods having a diameter of 5 cm. and lengths varying from 4 to 5 centimeters, is spread out in a rather thin layer having a thickness of 5 to 10 cm., on a support permeable to air, for instance on a lattice, and reheated, by means of a blowing machinery, by a powerful current of air, passing perpendicularly through this layer of ice. Since the thickness of the layer of ice is rather small, the removal of the residual saline solution retained in the ice becomes easier; the residual solution, driven by the melting water, flows from the layer of ice through the permeable support, without salting the lower beds of ice, as would be the case with a thick layer. The result is that the duration of the ventilation treatment may be reduced and thereby the output in ice, or in fresh water is improved. The practice has shown that with hollow rods of ice cut into short pieces as described hereinabove and spread out in a layer having a thickness of 6 cm., a ventilation of 4 minutes, with air at about 10° C., is sufficient for producing, after the melting of the ventilated ice, drinkable fresh water containing less than 0.5 gram per liter of saline components with an output of 60% of fresh water in relation to the weight of ice produced. Of course this output is the higher, the higher is the allowable amount of salt in the final product.

The continuously working plant shown in Fig. 5 includes a conveyor with a continuously driven latticed belt 22. Above the conveyor is arranged a stationary inclined plane 23 upon which fall at 24, the broken pieces of ice produced by a tubular refrigerator, as described hereinabove. A stationary harrow 25 allots in a comparatively thin layer the ice sliding from the inclined plane 23 on the conveyer 22 which transports this ice along of a blowing-machine 26 so that during the travel of the ice underneath the mouth of the blowing-machine the residual salted solution flows through the latticed belt 22, whereas the fresh ice is collected at the end of the conveyor 22. The amount of salt in the collected ice may be adjusted by adjusting the duration or the intensity of the ventilation, that is to say by adjusting either the speed of the conveyor 22, or the temperature or the output of the air in the blowing-machine 26, or by adjusting at the same time several of these factors. This adjustment may be carried out automatically with an apparatus measuring continuously or intermittently the amount of salt in the water melting from the ice collected at the end of the conveyor and actuating the motors (not shown) driving the conveyor or the blowing-machine.

What I claim is:

1. Plant for the production of fresh water from sea water including a cold generating machine to produce a cold-producing fluid, a tubular freezing apparatus fed with this fluid and including means to circulate the sea water to be frozen, a device to split up the hollow rods of ice made in said apparatus, a container for the reheating of the split hollow rods including a bottom provided with a water outlet, an intermediate latticed partition upon which the ice is spread, collecting means below said intermediate latticed partition for withdrawing melted saline water from said ice and permitting separation of ice containing the required amount of salt, a side air inlet below the latticed partition, a fan connected to said air inlet and means to adjust the temperature of the air blown by the fan in said container.

2. Plant for the production of fresh water from sea water including a cold generating machine to produce a cold-producing fluid, a tubular freezing apparatus fed with this fluid and including means to circulate the sea water to be frozen, a device to split up the hollow rods of ice made in said apparatus, a conveyor including a movable latticed belt, means to bring the split ice on this conveyor, means to spread the ice brought on the conveyor in a thin layer having a thickness from 5 cm. to 10 cm., a blowing machine provided with a mouthpiece set in the immediate vicinity above said conveyor and having the same width, collecting means below said conveyor for withdrawing melted saline water from said ice and permitting separation of ice containing the required amount of salt and means to regulate the speed of the conveyor as also the temperature and the output of the air from the blowing machine.

3. A process for obtaining fresh water from a saline solution, comprising the steps of partially freezing the saline solution, separating the thus obtained ice from the remaining solution, bringing said ice into a divided state, blowing through said divided ice a flow of warm air to reheat the same progressively up to a temperature slightly below 0° C., withdrawing simultaneously the salted melting water, separating ice obtained thereby containing the required amount of salt, and melting said finally obtained ice.

4. A process for obtaining fresh water from a saline solution, comprising the steps of partially freezing the saline solution by means of a brine at a temperature ranging from —5° to —10° C., separating the thus obtained ice from the remaining solution, bringing said ice into a divided state, blowing through said divided ice a flow of warm air so as to reheat the same progressively up to a temperature slightly below 0° C., withdrawing simultaneously the salted melting water, separating ice obtained thereby containing the required amount of salt, and melting said finally obtained ice.

5. A process for obtaining fresh water from a saline solution, comprising the steps of partially freezing the saline solution, separating the thus obtained ice from the remaining solution, bringing said ice into a divided state, spreading said divided ice in the form of a thin layer on an air and water-permeable support, blowing through said divided ice a downward flow of warm air so as to reheat the same progressively up to a temperature slightly below 0° C., the melting water dripping down meanwhile through said support, separating ice obtained thereby containing the required amount of salt, and melting said finally obtained ice.

6. A process for obtaining fresh water from a saline solution, comprising circulating the saline solution in a turbulent flow, partially freezing said circulating solution, separating the thus obtained ice from the remaining solution, converting said ice into a divided state, blowing through said divided ice a flow of warm air so as to reheat the same progressively up to a temperature slightly below 0° C., withdrawing simultaneously the salt containing melting water, separating therefrom ice containing the required amount of salt, and melting said finally obtained ice.

7. A process for obtaining fresh water from a saline solution, comprising partially freezing the saline solution to be thereby converted into hollow rods of ice, separating said hollow rods from the remaining solution, cutting said rods of ice in short stubs, blowing through said stubs a flow of warm air so as to reheat the same progressively up to a temperature slightly below 0° C., withdrawing simultaneously the salted melting water separating therefrom ice containing the required amount of salt, and melting said finally obtained ice.

8. A process for obtaining fresh water from a salt solution, comprising the steps of circulating the salt solution in a turbulent flow, partially freezing said solution circulated in said turbulent flow by means of a brine at a temperature ranging from —5° C. to —10° C., so as to be converted thereby into hollow rods of ice, separating said hollow rods of ice from the remaining solution, cutting said rods of ice into short stubs, blowing through said stubs a downward flow of warm air so as to reheat the same progressively up to a temperature slightly below 0° C., withdrawing simultaneously the salted melting water, separating therefrom ice containing the required amount of salt, and melting said finally obtained ice.

9. A process for concentrating saline solutions by freezing, comprising the steps of cooling said solution in three successive heat exchange steps, partially thereby freezing said solution, separating the thus obtained ice from the remaining solution, circulating said cold remaining solution in counterflow with the salt solution to be cooled, which constitutes said first heat exchanging step, bringing said ice into a divided state, blowing through said divided ice a downward flow of warm air so as to reheat the same progressively up to a temperature slightly below 0° C., withdrawing simultaneously the salted melting water, separating therefrom ice containing the required amount of salt, circulating said cold melting water in counterflow with the salt solution to be cooled and thereby constituting said second heat exchanging step, melting said finally obtained ice, recovering the melting heat of said finally obtained ice by means of said third heat exchanging step with the salt solution to be cooled.

10. A plant for the production of fresh water from sea water comprising a cold generating machine to produce a cold-producing fluid, a tubular freezing apparatus adapted to be supplied with this fluid and including means to circulate sea water to be frozen, a device to split-up the hollow rods of ice made in said apparatus, a pervious support upon which the ice is spread, collecting means below said pervious support for withdrawing melted saline water from said ice and permitting separation of ice containing the required amount of salt, a blowing machine being disposed to blow warm air through the divided ice located on said support, and means to adjust the temperature of the air blown by the blowing machine.

References Cited in the file of this patent

UNITED STATES PATENTS

| | | |
|---|---|---|
| 1,931,347 | Gay | Oct. 17, 1933 |
| 2,057,598 | Schuftan | Oct. 13, 1936 |
| 2,241,726 | Krause | May 13, 1941 |
| 2,395,498 | Noyes | Feb. 26, 1946 |